United States Patent [19]
Swengel, Sr.

[11] 3,715,629
[45] Feb. 6, 1973

[54] WIRING DEVICE FOR INTERCONNECTING MODULE CIRCUIT UNITS

[75] Inventor: Robert Charles Swengel, Sr., Hellam, Pa.

[73] Assignee: AMP Incorporated, Harrisburg, Pa.

[22] Filed: April 5, 1967

[21] Appl. No.: 629,868

Related U.S. Application Data

[63] Continuation of Ser. No. 848,568, Oct. 26, 1959, abandoned.

[52] U.S. Cl.........317/101 R, 317/101 D, 339/258 R, 339/258 P

[51] Int. Cl...........H02b 9/00

[58] Field of Search.........317/101 A, 101 D, 101 CE; 174/68.5; 339/17 R, 17 C, 258 R, 258 P, 176 M, 259, 182 N; 29/625–627

[56] References Cited

UNITED STATES PATENTS

| | | | |
|---|---|---|---|
| 2,803,788 | 8/1957 | Sanders, Jr. | 317/101 D |
| 2,816,253 | 12/1957 | Blitz | 317/101 D |
| 2,985,709 | 5/1961 | Mammola | 317/101 CE X |
| 3,041,504 | 6/1962 | Lacan | 317/101 CC |

*Primary Examiner*—Bernard A. Gilheany
*Attorney*—Curtis, Morris and Safford, Marshall M. Holcombe, William Hintze, William J. Keating, Frederick W. Raring, John R. Hopkins, Adrian J. La Rue and Jay L. Seitchik

[57] ABSTRACT

This invention relates to a modular system and its components, and more particularly to a system wherein the functional circuit cells or circuit modules are pluggable elements in a framework providing essentially three dimensions for the intermodule wiring. The framework includes sidewall panels having printed circuitry strips on one side thereof and electrical contacts of the other side thereof, the contacts being selectively connected to the printed circuitry strips according to a predetermined pattern.

17 Claims, 19 Drawing Figures

WIRING DEVICE FOR INTERCONNECTING MODULE CIRCUIT UNITS

CROSS-REFERENCES TO RELATED APPLICATIONS

This application is a continuation of my earlier copending application Ser. No. 848,568 filed Oct. 26, 1959, titled MODULE SYSTEMS, now abandoned.

Various proposals for packaging functional circuits or subcircuits in modular form have been advanced mainly because of the attractiveness of space savings through the compaction offered by the building block technique, or cost savings posed by the possible automated production of the modules, or time savings in maintenance and repair by virtue of the more readily traced and replacement of a failed circuit. At present, however, the commercial application of such modular systems has been limited because of their creation of new problems as vexing as each problem the system solved. For example, heretofore no completely modular system is known having sufficient flexibility in adaption to the needs of a large enough segment of the industry to justify economically the building of mass production machinery, the modules themselves are too expensive to justify their discard on failure of an element, largely because of the need to combine several circuit functions in each module. Frequently the modules are so complex that the design time for intra- and inter-module wiring is more difficult and time consuming than standard circuitry.

It is, therefore, an object of the present invention to provide a modular system wherein the modules are simple, inexpensive, and may economically contain as few or as many circuit components as desired. Closely associated with this objective is the present achievement of a modular unit design which is pluggable into a receptive interconnecting framework in a frictional connection providing redundancy of contact for each junction with the connector elements being completely protected, even upon extreme abuse.

Another object is to provide a modular system which is constructed, apart from the functional components of the electronic circuit involved, of a minimum number of standard parts which can readily be adapted or altered in accordance with the requirements of any particular electronic device susceptible to modularization.

A further object is to provide, in a modular system, a wiring framework which is constructed of sectional elements subject to automated adaptation from a standard design to the conditions of any particular use.

Another object is to provide, in a modular system, a three dimensional grid wiring device for simplification of the design layout of the intermodular wiring.

Another object is to provide a modular system having a high volumetric efficiency, yet preserving easy accessibility for the individual modular units for replacement upon failure and providing for intermodule shielding.

Another object is co provide a three dimensional wiring framework for a modular system into which the module units are plugged.

Another object is to provide a modular system in which the module units may be polarized and coded to eliminate misinsertion.

These objects are, in general, attained by providing a module box in which the circuit components of the modular unit or cell are contained, two opposite sides of the box having a series of channels regularly spaced according to a predetermined center-to-center grid spacing system. All, or preselected ones of the channels, have recessed elongated sockets which are connected to the terminal points of the module circuit components and adapted to receive a contact blade endwise in a sliding frictional engagement. A wiring framework for interconnecting the module boxes includes a base panel and a series of sidewall panels between pairs of which rows of module boxes are arranged to be plugged. Printed circuitry lines, lengthwise extending and regularly spaced across the width of the sidewall panels, serve as the intermodule wiring. A series of parallel and regularly spaced blades transversely mounted edgewise on the sidewall panels provides for circuit continuity from the sockets to the printed circuitry lines of the sidewall and base panels by integral tines arranged for selective connection with the printed circuitry.

Either the blades or the sockets have, along their length, a series of independently acting spring elements for redundancy of contact.

In accordance with another feature, advantage is taken of the three dimensional array of the wiring framework to arrange the wiring paths linearly to facilitate automated production of the framework sections.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

DESCRIPTION OF THE PREFERRED EMBODIMENTS

Figure 1:
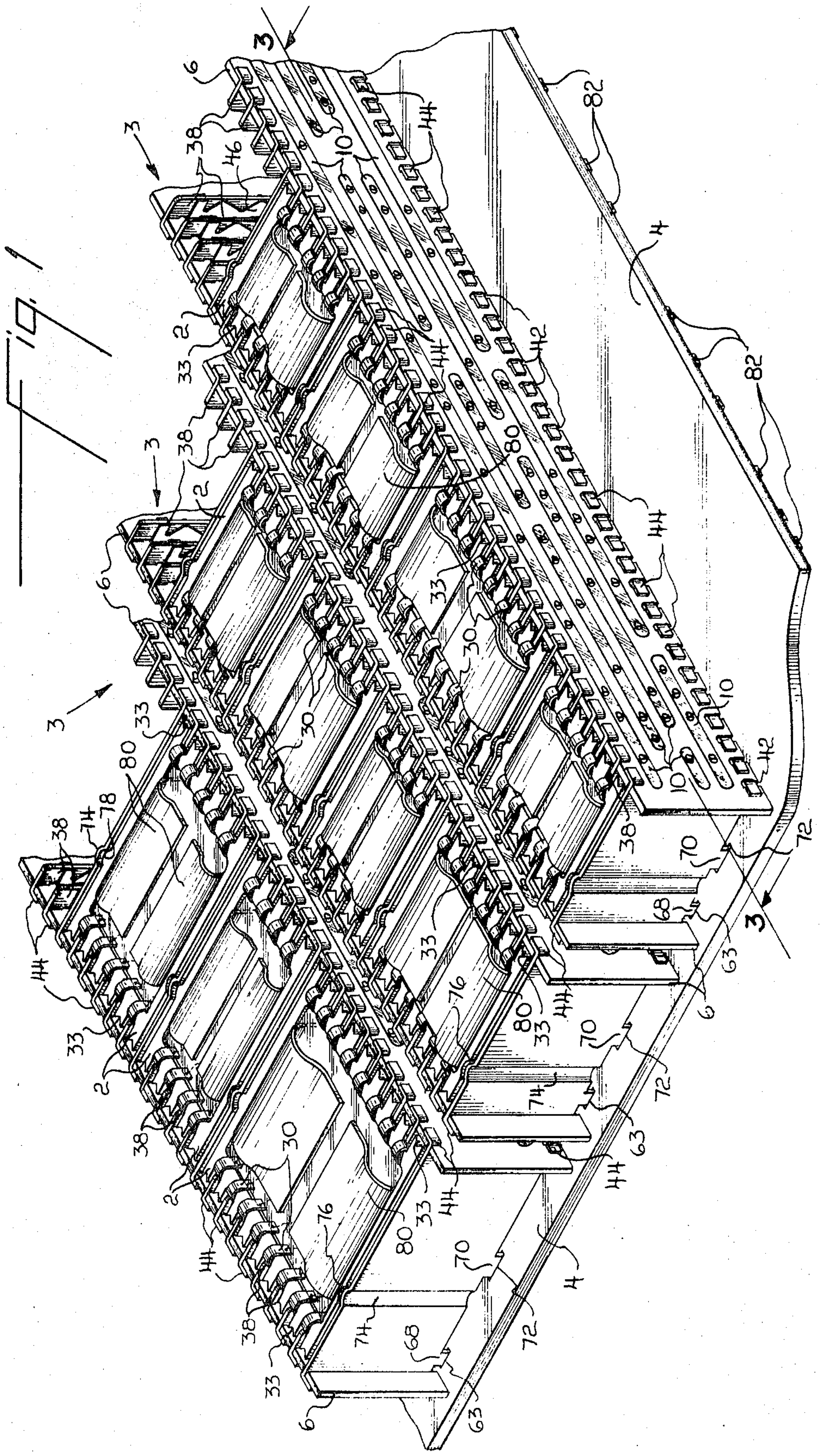
FIG. 1 is a fragmentary perspective view of a modular array constructed in accordance with the present invention.
Figure 2:
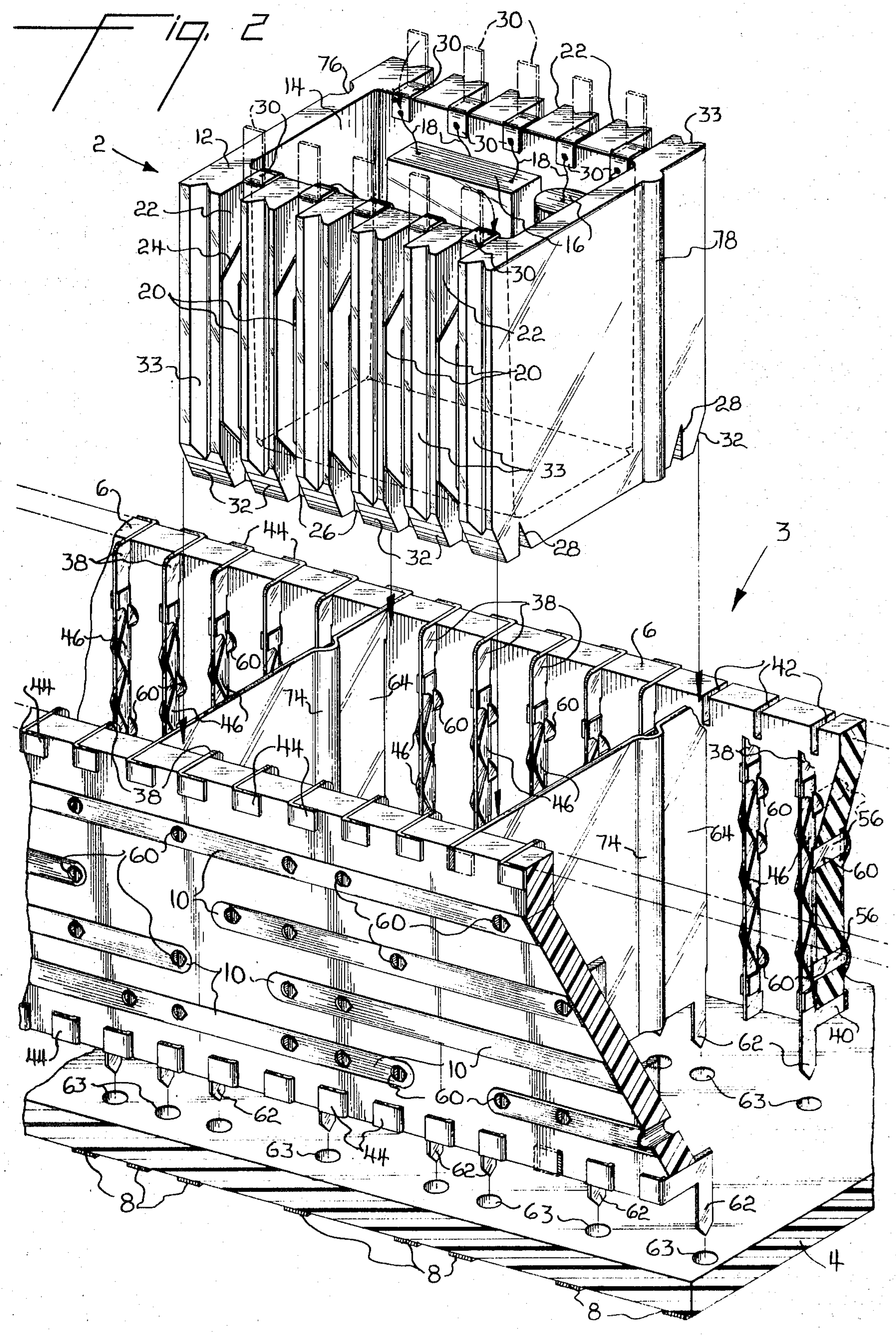
FIG. 2 is a partially exploded perspective view on an enlarged scale of a modular section of FIG. 1.

Referring now to an illustrative embodiment of the present invention as shown in FIGS. 1 and 2, various electrical components, such as resistors, condensers, coils, transistors, diode devices, transformers and the like, forming an electrical circuit, or subcircuit of a larger circuit network, are incorporated in a series of module units 2 plugged into a wiring framework 3 which serves as the means for interconnecting the modules and for connecting the modular array to external circuitry or other modular arrays. The wiring framework additionally serves as a structural element rendering the modular array mechanically self-supporting, and basically includes a base panel 4 of any suitable insulating material and a series of sidewall panels or rails 6 of insulating material mechanically set edgewise in parallel on base panel 4. On the panels 4 and 6 are printed circuitry strips 8 and 10 constituting the inter- and extra-module wiring which communicates with the terminal junctions of the electrical components in the module units through the agency of sliding contact connector assemblies (FIGS. 2 and 5-9) arranged to render the module units readily pluggable into and out of the wiring framework, all as will be explained in detail.

It will be noted that panels 6 are arranged in pairs, and between each pair is positioned a row of modules 2 which individually may be of different lengths as desired. Further, various pairs of panels 6 may have a different spacing to accommodate modules of corresponding widths, preferably in accordance with a planned grid spacing system to the achievement of which the present invention is particularly suited as will become apparent.

Turning now to FIG. 2, the module unit 2 in the illustrative embodiment is seen to comprise a hexahedral hollow box or receptacle 12 of electrically insulating material open at the top to provide a cavity 14 in which the functional components, indicated at 16, of an electrical circuit or subcircuit are contained. Preferably box 12 has an integral bottom so that it can act as its own mold where it is desired to have a completely encapsulated and hermetically sealed unit, the potting compound, such as a suitable epoxy type resin, simply being poured into the box after the components have been positioned with their leads 18 electrically attached to the contacts 20 of the module.

The module part of the contact assembly, to achieve the rugged, reliable and wholly protected sliding contact arrangement desired, includes a series of elongated, metallic channel-shaped contact elements, or plug sockets 20 snugly received in a generally correspondingly shaped series of channels 22 in the front and back sides of box 12 as viewed in FIG. 2. The series of channels 22 are regularly spaced and traverse at right angles the length of block 12 along the length of panels 6. Further, the channels are U-shaped in cross-section of preferably constant dimensions regardless of length, width or height of the various sizes of boxes contemplated to be used in accommodating the various electrical components of the electronic system involved. The thus mutually parallel array of channels 22 correspondingly accommodate and position in like array the series of plug sockets or contacts 20 which have an elongated channel-shaped body portion 24, the upstanding sidewalls of which are to provide the exterior contact surfaces of the module unit. In height, the sidewalls are slightly less than the depth of channels 22 whereby the contacts advantageously are wholly recessed in the channels, FIG. 8. Preferably, the opposed sidewalls of each contact present parallel surfaces, as best shown in FIG. 7, and effectively comprise a metallic lining for the parallel sidewalls of the module channels 22.

Figure 8:
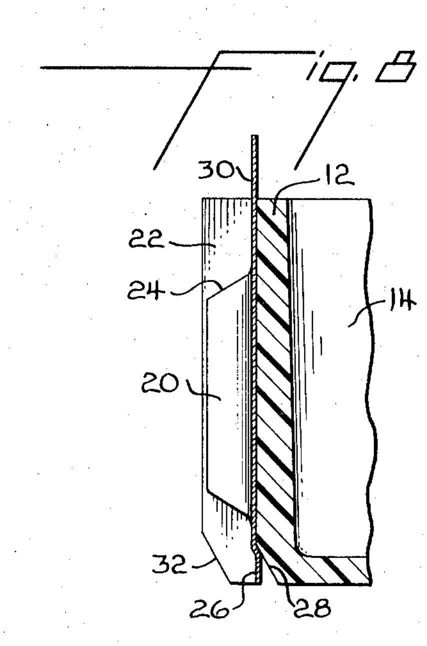
FIG. 8 is a sectional view taken along lines 8—8 of FIG. 7.
Figure 7:
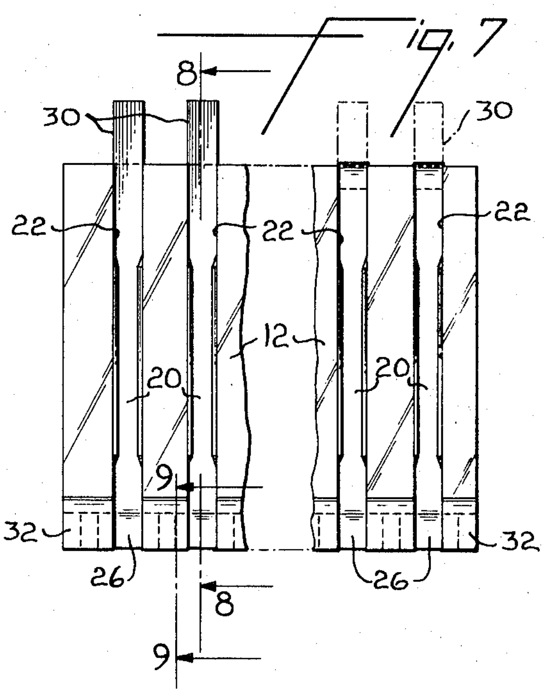
FIG. 7 is an enlarged front view of socket connectors mounted on a module unit for cooperation with blade connectors, as shown in FIG. 6, to form the connection of FIG. 5.
Figure 9:
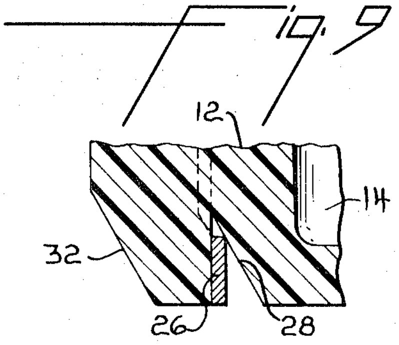
FIG. 9 is a fragmentary sectional view on a greatly enlarged scale taken along lines 9—9 of FIG. 7.

To anchor and accurately locate the position of contacts 20 in channels 22, there extends from one end of body portion 24 an anchoring tab 26 having a pair of laterally extending ears engageable behind the lateral shoulders, relative to the axis of the channels, provided by a V-shaped groove 28 extending along a line in the bottom of the module box intersecting a row of channels 22 adjacent their base, as best shown in FIGS. 7–9. Extending longitudinally from the other end of body portion 24 to an extent so as to project upwardly out of channel 22 is a solder or welding tab 30 to which the terminal leads of the functional components of the module are to be attached. Tabs 30 have a length sufficient to be bendable around the upper edge of the box and into cavity 14, as indicated in FIG. 2, whereby on potting the solder or welded connection to tabs 30 may also be covered. In order that the contacts remain in position in channels 22 prior to final assembly of the module, the sidewalls of body portion 24 preferably are spread slightly in excess of the width of channels 22 to afford a slight frictional grip therebetween upon pressing the contacts into the channels.

As the parallel front and back sides of box 12 are to be closely fitted between a pair of panels 6, the bottom of the box at its front and back edges 32 may be beveled for facilitating insertion. In addition, to avoid the close fitting relation engendering moisture traps which could result in electrical shorts between adjacent contacts 20, longitudinal grooves 33 in the land areas between channels 22 provide a path for air circulation or ventilation.

On final assembly of the modular unit, a number of contacts 20, at least equal to the number of terminal leads of the component or network to be incorporated in the modular unit, are inserted into appropriate channels 22 according to the overall layout of the circuit interconnections of the wiring framework. After soldering or welding such terminal leads 18 to the appropriate solder tabs 30, and positioning the circuit components or network within the cavity 14, tabs 30 are then bent over and a potting compound, where encapsulation is desired, is poured into a level generally flush with the top edges of the box.

Figures 14, 15, 16, 17, 18:
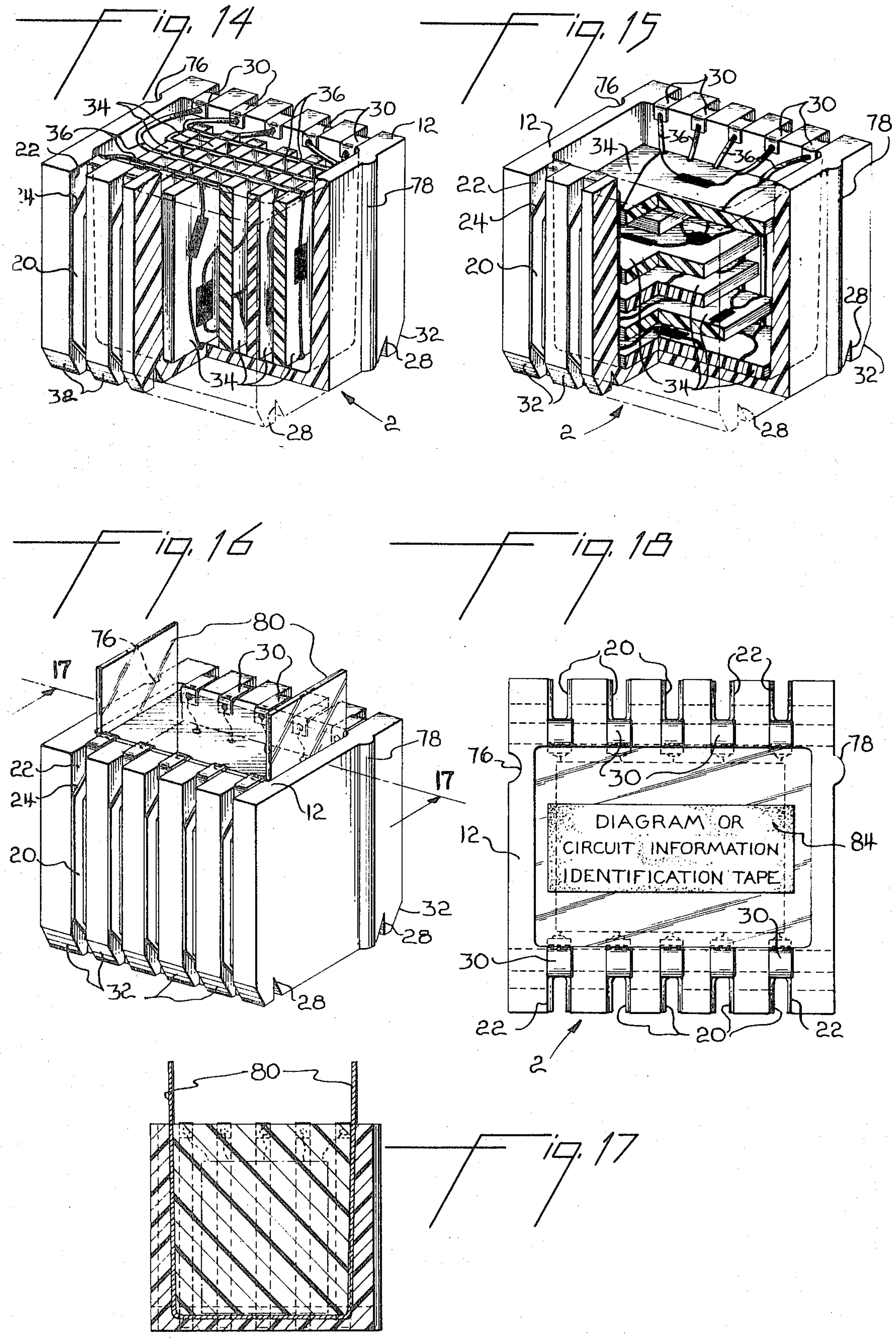
FIG. 14 is a perspective view partly broken away of a module unit illustrating the incorporation of circuit components in the module.
FIG. 15 is a view similar to FIG. 14 illustrating another arrangement for the incorporation of circuit components.
FIG. 16 is a perspective view of a module unit having pull tabs for withdrawing the unit from the array.
FIG. 17 is a sectional view taken along lines 17—17 of FIG. 16.
FIG. 18 is a greatly enlarged plan view of a module unit illustrating the use of the top surface of the module for informational purposes.

It is to be understood that the circuit components or network incorporated in the modular unit may have a character such as the conventional bulk components indicated in FIG. 2. Another exemplary form is the multi-layer ceramic wafer blocks 34 illustrated in FIGS. 14 and 15. In the construction of such blocks, the wafers either carry or have printed directly on their surfaces the functional electrical components, interconnections between the wafer layers being had by printed circuitry leading to the wafer edges along which a series of fine wires 36 are arranged, all as is well known in the art. Blocks 34 may either be laid on their side or be disposed upright as indicated in FIGS. 14 and 15 respectively, the ends of wires 36 serving as terminal leads for soldering or welding to contact tabs 30 to complete electrically the module construction.

As thus designed, it can be seen that the form and construction of the modular units 2 is extremely rugged, being of essentially a unitary block-like configuration with no protruding fragile parts, simple to assemble as has been explained, from parts that are easily fabricated. The receptacle boxes 12 may be made by any standard machining, casting or molding techniques from any of a wide range of insulating materials, whereas the contact elements thereof are susceptible to fabrication by die stamping techniques from very thin gauge strip metal stock.

Figure 6:
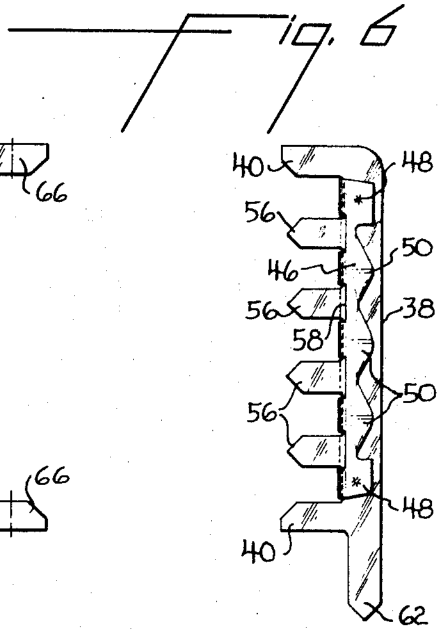
FIG. 6 is an enlarged side view of a blade connector in the contact assembly of FIG. 5.

The wiring framework part of the contact assembly, FIGS. 2 and 6, includes a series of flat blades or ribs 38, conveniently stamped out of suitable sheet metal stock, mounted to set edgewise on the opposed inside faces of the pairs of panels 6 in a mutually parallel array, the length of each blade traversing the associated rail so as to be in a position relatively to slide endwise in a mating one of the channel contacts 20 as a module unit is inserted between the panel pair. Any convenient means for supporting and correctly keying the position of blades 38 along the length of rails 6 at the regular spacing necessary for correspondence with the spacing of channels 22 and contacts 20 will suffice. In the illustrative form, a pair of lateral locking tabs 40 extending from an edge of each blade adjacent or at its ends are spaced so as to be inserted through one pair of a series of pairs of regularly spaced slots 42 extending in aligned relation inwardly from opposite side edges of the panels 6, the tabs being of sufficient length so as to project from the outside surfaces of the panels whereby bending over the projecting ends 44 of the tabs of each blade in opposite directions serves to clinch the blades in correctly keyed position.

Insertion of a module block unit 2 between a pair of panels 6, FIG. 2, results in the series of contact elements 20 on the module unit being telescoped respectively over a corresponding number of blades 38, the upper ends of the blades entering between the substantially more widely spaced sidewalls of channel section 24 and moving relatively centrally therealong until the module unit is fully seated adjacent base panel 4. As each blade enters and moves between the sidewalls of a channel section 24, there is brought into play a series of resilient and independently acting spring elements providing a multiplicity of contact areas between the sides of the blade and the sidewalls of channel section 24 along their lengths. In the form illustrated in FIGS. 2, 5 and 6, the spring pressure for the sliding frictional contact is generated by an elongated U-shaped channel 46 of thin gauge spring quality sheet metal stock fitted over the edge of blade 38 between locking tabs 40. To secure channel 46 to blade 38 and assure continuity of electrical contact, the ends 48 of the channel may be spot-welded to the blade. Between these ends 48, the sidewall edges of the channel are scalloped along their length to provide a series of nodes 50 normally directed away from the sides of blade 38 to an extent such that the spacing between a pair of nodes on opposite sides of the blade exceeds slightly the width of the sidewalls of channel section 24 of contacts 20. As thus constructed, from FIG. 5 it will be observed that as a blade 38 is telescoped within channel section 24, the nodal projections of spring channel 46 are cammed inwardly towards one another, thus to engage in sliding frictional contact the sidewalls of channel section sidewalls. For protective purposes, the sidewalls of spring channel 46 are somewhat less in length than the width of blade 38, and further the spring quality should be such that no permanent set is taken upon pressing nodes 50 against the sides of blade 38.

Alternatively, the spring elements for developing the spring contact pressure in the contact assembly may depend from contacts 20, preferably integrally for manufacturing simplification. Thus, in FIGS. 11–13, the contact element of the wiring framework simply comprises a blade 38*a* similar in detail to blade 38 without spring channel 46. In contact 20*a* of the module unit, however, the base of the U-shaped channel section 24a has been blanked out, as at slot openings 52, at a plurality of points along its length so as to leave in the sidewalls only opposed pairs of bridging straps 54 which are bowed with a smooth continuous curvature inwardly towards each other to a spacing at least less than the thickness of blade 38, thus to define spring contact suspensions. As explained above, the main portion of the sidewalls of channel section 24*a* normally reside in contact with the sidewalls of channel 22*a*, thus it will be appreciated that as blade 38*a* is telescoped within channel section 24*a*, the opposed pairs of spring bridging straps will be cammed apart and each will be partially flattened against the sidewalls of channel 22*a*, resulting in a slight elongation of contact 20*a*. The character of spring system and the resultant spring contact pressure between the blade 38*a* and contact 20*a* depends in part upon the length of spring straps 54 which, to avoid any resonant condition under vibration, preferably are curved from pair-to-pair about different radii of curvature as indicated in FIG. 12.

Figures 11, 12, 13:
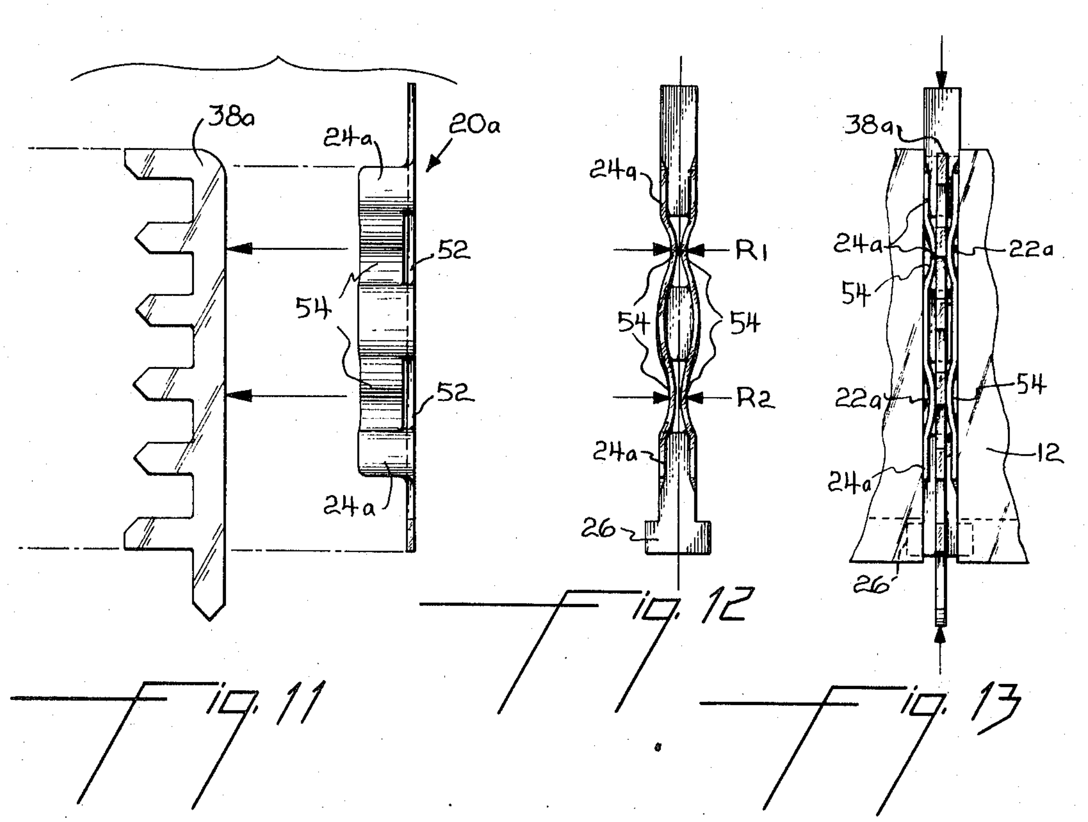
FIG. 11 is an exploded side view of an enlarged scale of a modified form of the connector assembly.
FIG. 12 is a front view of the socket connector of FIG. 11.
FIG. 13 is a front view of the connector assembly of FIG. 11 when the elements are in engagement.

To complete the circuit continuity between leads 18 of the circuit component 16 and processed circuitry strips 8 and 10, each contact blade 38 in the series, as best shown in FIGS. 2, 6 and 11, has a series of lateral integral tines 56, preferably regularly spaced along a side edge between lateral tabs 40, which are arranged to project, first through appropriate slots 58 in the base of spring channel 46 when such is used, and thence through a corresponding number of similarly spaced apertures 60 aligned between edge slots 42 in sidewall panels 6. In addition, blade 38 terminates in a longitudinally extending end tine 62 for projection through an aperture 63 of a row of such apertures in base panel 4. On assembly of the wiring framework, the ends of tines 56 and 62 projecting from the reverse sides of panels 6 and 4 are bent over, thus to be spatially disposed closely adjacent the various printed circuitry strips 10 and 8 brought to the edge of the panel apertures 60 and 63 whereupon deposition of solder buttons by any of the conventional techniques well known in the art, such as solder-dipping, completes the electrical connections.

Wiring access to a particular one of component leads 18 by one or more circuitry strips on the base panel may be had through connection with tine 62, and by any of the series of circuitry strips on either of the associated sidewall panel pair through connection with tines 56, which should prove sufficient for any circuit layout regardless of its complexity. Conversely, any of tines 56 and 62 and their associated apertures 60 and 63 may be eliminated where a lesser number of circuit strips, either on the base or sidewall panels or both, to a particular component lead 18 is needed. Furthermore, it will be apparent that blades 38 through tines 56 and 62 may serve simply to interconnect or jumper between any of circuitry strips 8 and 10 in circumstances, for example, where more cross-over points are needed than the surface area of the panels permit, it being anticipated that at least some of the module units will have available more exit points at contacts 20 than required by the number of leads 18 in a particular unit. In such cases, appropriate ones of contacts 20 are eliminated or simply left unconnected.

It will be understood that for simple circuit networks, all the interconnections between the modules may be provided on the sidewall panels through tines 56 and circuitry strips 10, whereby the base panel may comprise only a passive structural element, or may be eliminated. Conversely, for complex circuit networks, circuitry strips may desirably be located on both sides of the panels, all according to the conditions of a particular use.

Figure 10:
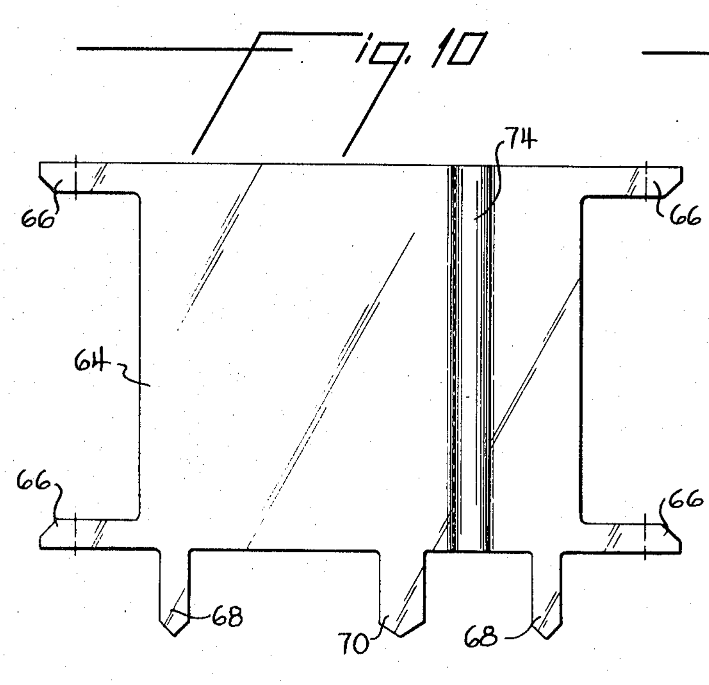
FIG. 10 is an enlarged side view of a spacer plate utilized in constructing the modular array of FIG. 1.

In assembling the wiring framework in order more accurately to fix and stabilize the relative disposition of each pair of sidewall panels, and to compartmentalize the space therebetween for facilitating orientation and location of the module units during insertion, a series of spacer plates 64, FIGS. 2 and 10, are strung between each sidewall panel pair. A pair of spaced locking tabs 66 extending laterally from each side edge of each plate 64 are arranged to project through appropriate edge slots 42 of the sidewall panels and be bent over, similar to the mounting of blades 38, thus to secure the plate to the sidewall panels and the panels together. From the lower edge of plate 64, there depends a pair of spaced locking tines 68 arranged to be bent over after projection through appropriate apertures 63 in the base panel and serving, in which end tines 62 of the contact blades assist, to secure the sidewall panel portion of the framework to the base panel. Plates 64, when formed of metallic material, are further advantageous in providing, in part, an electrical shield between adjacent module units.

For facilitating proper placement and orientation of the sidewall panel framework on the base panel and along the rows of apertures 63, an additional intermediate tab 70 depends from the lower edge of each plate 64 for mating cooperation with an elongated slot 72 in the base panel. Further, for polarizing insertion of the module units, each plate 64 has traversing its width an off-center elongated bead 74 on one side face and presenting a matching recess on the other side face for cooperation respectively with a similarly arranged recess 76 in one sidewall of a module box 12 and a bead 78 in the opposite sidewall of the next adjacent module box.

For convenience in unplugging the module units, a pull tab 80 may be incorporated in each unit, as by disposing a flexible lining having projecting ends of any suitable material in the receptacle box 12 before placement of circuit components and potting thereof, see FIGS. 16 and 17. Advantageously, the lining for selected units has a metallic body covering all the interior walls of the box for completely electrically shielding the incorporated components and additionally serving as a heat extractor for dissipating at the projecting ends any excess of heat in the unit.

From the foregoing description, it should be apparent that a circuit network can easily be subdivided into individual module units to any degree of fineness deemed desirable. A network thus constructed can be serviced simply by a process of substitution because of the pluggable nature and accessibility of the module units. Further, each module unit can be considered a throw-away element since the arrangement economically admits of as few as one circuit component per module and the separation of components prone to failure from more expensive and lasting network portions. More importantly, the arrangement is particularly suited to subdividing and packaging a complex circuit network into subcircuits or subnetworks, each performing a single function or subfunction, such as integrating, differentiating, amplifying and detecting for example.

In general, module boxes 12 are contemplated to vary in height, length and width consonant with the physical size, density and number of terminal junctions of the incorporated circuit components. Regardless of such variations, however, the regular center-to-center spacing of contacts 20 and channels 22, blades 38, slots 42 and base panel apertures 63, and tines 56 and sidewall panel apertures 60 preferably remains the same. A convenient spacing increment in practice has been found to be 0.10 inches. Any increase or decrease in size of the module boxes 12, and corresponding dimensional changes in the remainder of the system, may also be based on the same increment, i.e., 0.10 inches. It will thus be apparent that where the only variable is the length of the module boxes along the sidewall panels, so as to include boxes of different capacity and number of contact assemblies, the remainder of the system may be drawn from a supply of parts of a single size. Where an additional size is required in the width of the module boxes, only a corresponding set of additional spacer plates need be stocked, base panel 4 simply having the rows of apertures drilled to match the varied spacing of the sidewall panel pairs. The height of the module boxes relative to each other or to the sidewall panels may vary with little mechanical or electrical effect, although excessive variation adversely affects volumetric efficiency.

Figure 3:
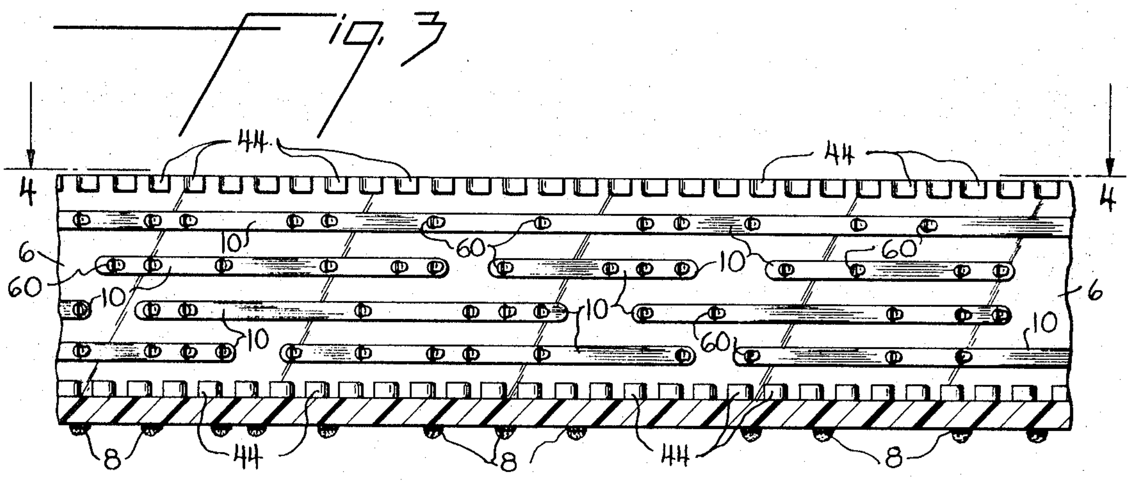
FIG. 3 is a view in side elevation taken along lines 3—3 of FIG. 1.
Figure 4:
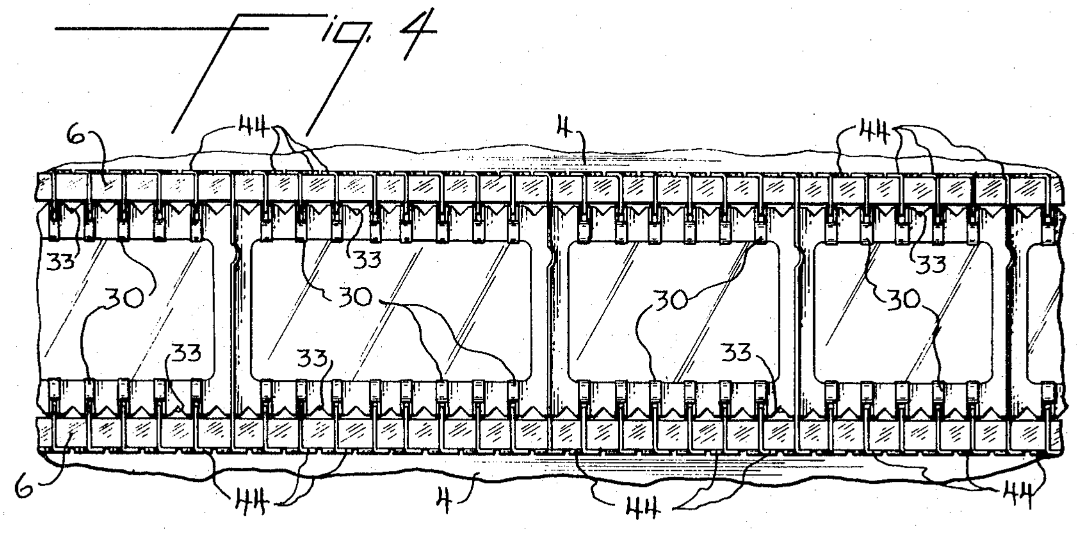
FIG. 4 is a partial plan view taken along lines 4—4 of FIG. 3.
Figure 5:
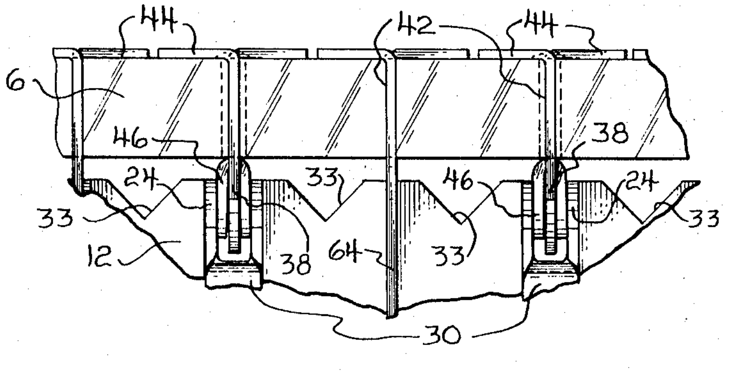
FIG. 5 is a fragmentary plan view on a greatly enlarged scale illustrating the engagement of a connector assembly for circuit continuity between the module units and the receptive wiring framework.

As thus constructed, it will be evident that because of the three dimensional aspect presented by the sidewall panels and the base panel, the laying out of the intermodule wiring even for complex networks is simplified. The ease of circuit layout may be furthered by arranging the circuitry strips of the sidewall panels and the parallel contact assemblies, with particular reference to blades 38, generally in crossed grid network fashion. Thus circuit strips 10 advantageously extend along longitudinal lines regularly spaced across the width of panels 6 so as to traverse the parallel array of blades 38 in one-to-one correspondence and alignment with tines 56, as best shown in FIGS. 2 and 3. In the illustrative form, there are four such lines matching the four tines 56 of each blade 38 whereby any component lead 18 of one module unit may have circuit continuity with a component lead of any other module unit through any of four possible paths on either of the two associated sidewall panels. Circuit strips 10 may, of course, be broken or interrupted along their lines of extent whereby each strip may provide several isolated continuity paths between correspondingly located tines 56 as desired.

Similarly, circuit strips 8 of the base panel may constitute part of the crossed grid system and thus are arranged, as shown, to extend along lines perpendicular to circuit strips 10 at regularly spaced intervals in accordance with the location of tines 62, ultimately to terminate in edge pads 82 engageable by a conventional printed circuit board edge connector block, not shown, to provide for external connections to the modular array on the base panel as desired.

Figure 19:
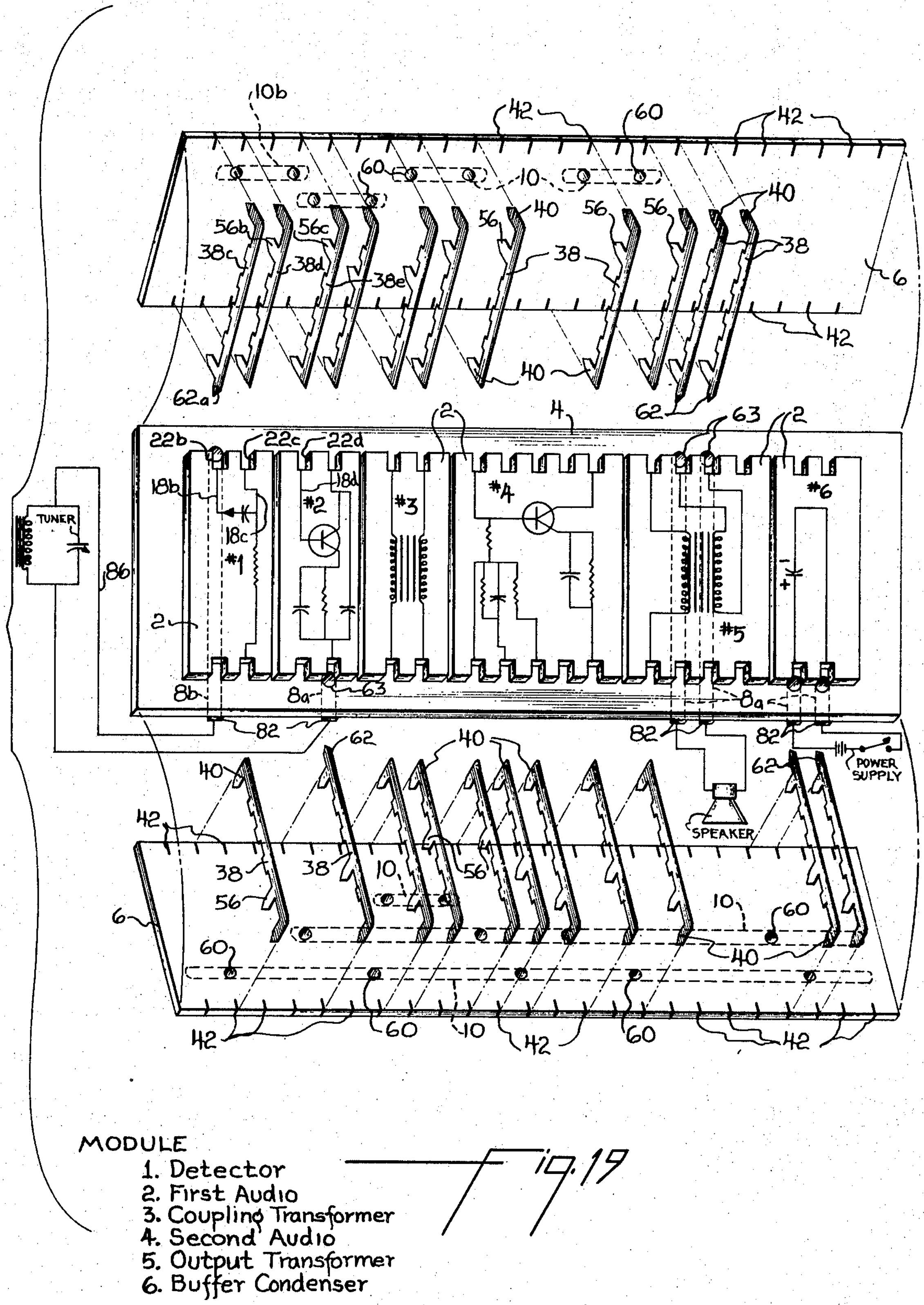
FIG. 19 is a diagrammatic illustration of the modularization of a simple electronic circuit, schematically shown, in accordance with the principles of the present invention.

In the laying out of a particular circuit network, it will be understood that all the interconnections made possible in the system will not be needed, and hence may be omitted by selective elimination of various contact assemblies and circuit strips in whole or in part, as exemplified in the single diode, two transistor receiving circuit diagrammatically illustrated in FIG. 19. As shown, the receiver has been subdivided into six modulator interconnected units utilizing only such interconnection contacts and circuit strips as required. The receiver speaker, power supply and tuner may be otherwise conventionally mounted on the base panel or elsewhere on the recessed receiver chassis, as desired, circuit strips **8*a* providing access to the modulator array. An exemplary portion of the circuit may be traced as follows: signals received by the tuner are applied to the detector of module unit No. 1 through wire 86, base panel strip 8*b*, end tine 62*a*, blade 38*c*, the contact 20 (not shown) in module channel 22*b*, and component lead 18*b*. Detected output signals at component lead 18c are conducted from channel 22*c*, to blade 38*d*, lateral tine 56*b*, circuit strip 10*b*, lateral tine 56*c*, blade 38*e*, the contact 20 in channel 22*d*, and component lead 18*d*, thus to the input of the first audio stage in module unit No. 2**.

For identification, coding strips 84, such as an adhesive backed plastic material having the schematic diagram of the incorporated components printed thereon, may be applied to the exposed surface of each module unit.

By employing the principles of this invention, it will be apparent to those skilled in the art that the constitution of the basic elements of construction readily admits of an arrangement whereby the parts of specific form required in the assembly of a particular circuit may readily be derived by automatic machinery from a small variety of standard parts which may be partially preformed. For example, the sidewall panels may be mass produced in a preform consisting of a panel having edge slots 42 and circuit strips 10 running continuously along the panel length. Such panel preforms may be subsequently prepared for specific use as the need arises by conventional punched tape controlled automatic machinery, for example, which first may trim the panel to length where required, then selectively drill apertures 60 and interrupt circuitry strips 10 either by drilling holes or slotting the panel across the circuitry strips or by grinding or burnishing away the metal of the circuitry strips at appropriate points along their lengths.

I claim:

1. A wiring device for interconnecting modular circuit units comprising a base panel having printed circuitry on at least one surface, a pair of sidewall panels each having printed circuitry on at least one surface, means for supporting said sidewall panels parallel to each other and edgewise on said base panel, a plurality of insulating boxes fitted between said sidewall panels for receiving the electrical components of said units, a plurality of regularly spaced parallel channels in each side of each said boxes which faces said sidewall panels, a plurality of two-part slide-fit frictional connectors, one part of each connector being mounted in one of said channels and having means for connecting with an electrical component, the mating parts of the connectors being mounted on the opposed sides of said sidewall panels and having contact fingers for connection with the printed circuitry of at least said sidewall panels.

2. A wiring device for interconnecting modular circuit units comprising a base panel having printed circuitry on at least one surface, a pair of sidewall panels each having printed circuitry on at least one surface, spacer plate means engaging and maintaining said sidewall panels parallel to each other and edgewise on said base panel, a plurality of module elements fitted between said sidewall panels receiving the electrical components of said units, a plurality of slide-fit frictional connectors, one part of each connector being mounted on a module element and having means for connecting with an electrical component, the mating parts of the connectors being mounted on the opposed sides of said sidewall panels and having contact means connected with the printed circuitry of at least said sidewall panels.

3. A wiring device for interconnecting modular circuit units in pluggable elements comprising a plurality of insulating receptacles for containing the electrical components of a unit and having regularly spaced longitudinal exterior grooves in two opposite sides, a plurality of slide-fit frictional connectors each including a blade and a socket therefor, the connector sockets being recessed in said grooves and having means for connecting with said components, a framework for pluggably receiving said receptacles including a pair of sidewall panels, means for securing said panels in parallel spaced relation, each said panel having printed circuitry thereon for interconnecting said units, the connector blades being transversely mounted on the opposed sides of said sidewall panels for slidably engaging said connector socket upon the receptacles being inserted between said sidewall panels, and means on said blade connectors for connection with said printed circuitry.

4. A wiring device for interconnecting modular circuit units in pluggable elements comprising a plurality of insulating receptacles each for containing the electrical components of a unit and having regularly spaced longitudinal exterior grooves in two opposite sides, a plurality of slide-fit frictional connectors each including a blade and a socket, the connector sockets being recessed in said grooves and having means for connecting with said components, a framework pluggably receiving said receptacles including a pair of spaced sidewall panels mounted edgewise on a base panel, said panels having printed circuitry thereon interconnecting said units, the connector blades being transversely mounted on the opposed sides of said sidewall panels slidably engaging said connector sockets upon the receptacle being inserted between said sidewall panels, and means on said blade connectors connected with said printed circuitry.

5. A wiring device for interconnecting modular circuit units in pluggable elements comprising an insulating receptacle for containing the electrical components of a unit and having regularly spaced longitudinal exterior grooves in two opposite sides, a plurality of slide-fit frictional connectors each including a blade and a socket, the connector sockets being recessed in said grooves and having means for connecting with said components, a framework for pluggably receiving said receptacle including a pair of sidewall panels each having a series of regularly spaced pairs of opposed slots extending inwardly of the side edges thereof, a base panel, spacer plate means having tabs engageable with a pair of slots of each sidewall panel and with said base panel for mounting said sidewall panels in spaced relation edgewise on said base panel, said panels having printed circuitry thereon for interconnecting said units, each connector blade having tab means engageable with a pair of said slots for transversely mounting the blades on the opposed sides of said sidewall panels for slidably engaging said connector sockets upon a receptacle being inserted between said sidewall panels, and means on said blade connectors for connection with said printed circuitry.

6. A wiring device for interconnecting pluggable modular circuit units comprising a framework including a pair of sidewall panels having printed circuitry thereon, means securing said panels in parallel spaced relation, the circuitry on said sidewall panels extending on the exterior sides along longitudinal lines regularly spaced across the width thereof, a component module received between and having opposed side surfaces disposed closely adjacent the interior sides of said sidewall panels, a plurality of parallel electrical interconnections between said module and sidewall panels, each interconnection including a blade transversely mounted edgewise on a sidewall panel and a blade receiving socket on the module side surface, the edge of said blade adjacent the interior side of the associated panel having regularly spaced projection points from which integral contact tines selectively project, said associated panel having apertures admitting said contact tines therethrough and soldered to the printed circuitry thereon, and said socket having means for connection with the components of said module.

7. A wiring device for interconnecting pluggable modular circuit units comprising a framework including a pair of spaced sidewall panels mounted edgewise on a base panel, printed circuitry on said panels, the circuitry on said sidewall panels extending on the exterior sides along longitudinal lines regularly spaced across the width thereof, a component module received between and having opposed side surfaces disposed closely adjacent the interior sides of said sidewall panels, a plurality of parallel electrical interconnections between said module and sidewall panels, each interconnection including a blade transversely mounted edgewise on a sidewall panel and a blade receiving socket on the module side surface, the edge of said blade adjacent the interior side of the associated panel having regularly spaced projection points from which integral contact tines selectively project, said associated panel having apertures admitting said contact tines therethrough and soldered to the printed circuitry thereon, and said socket having means for connection with the components of said module.

8. A wiring device for interconnecting pluggable modular circuit units comprising a framework including a pair of spaced sidewall panels mounted edgewise on a base panel, printed circuitry on said panels, the circuitry on said sidewall panels extending on the exterior sides along longitudinal lines regularly spaced across the width thereof, a component module received between and having opposed side surfaces disposed closely adjacent the interior sides of said sidewall panels, a plurality of parallel electrical interconnections between said module and sidewall panels, each interconnection including a blade transversely mounted edgewise on a sidewall panel and a blade receiving socket on the module side surface, the edge of said blade adjacent the interior side of the associated panel having regularly spaced projection points from which integral contact tines selectively project, said associated panel having apertures admitting said contact tines therethrough and soldered to the printed circuitry thereon, said blade having an end projection from which an integral tine selectively projects through one of a series of apertures in said base panel for connection with the printed circuitry thereof, and said socket having means for connection with the components of said module.

9. In a wiring device for interconnecting modular circuit units, a base panel having printed circuitry thereon, a sidewall panel having printed circuitry paths extending longitudinally along a side thereof, a plurality of pairs of regularly spaced opposed slots extending inwardly of the side edges of said sidewall panel, a plurality of contact blades each having a pair of tabs engageable in a pair of said slots for mounting the blades on said sidewall panel in contact engageable relation with mating contact elements of the modular units, each blade having contact tine means for selective engagement with the printed circuitry of said base and sidewall panels.

10. A wiring device for interconnecting modular circuit units comprising a base panel having printed circuitry thereon, a pair of spaced sidewall panels mounted on said base panel and each having printed circuitry paths extending longitudinally along a side thereof at intervals across its width, said sidewall panels having at least one module unit therebetween, and a series of parallel electrical connectors between the sides of the module and the sidewall panels, each of said connectors including in one part means along its length selectively to connect with any of said circuitry paths crossing said length and means selectively to connect with a printed circuitry path on said base panel, said connectors further including a second part mating with said one part and recewsed in the side of a module unit with means for connection to a component lead thereof.

11. A wiring device for interconnecting modular circuit units comprising a base panel having printed circuitry thereon, a pair of spaced sidewall panels mounted on said base panel and each having printed circuitry paths extending longitudinally along a side thereof at intervals across its width, a row of module units received between said sidewall panels, and a series of parallel connectors each having one part extending across the width of a sidewall panel, said one part having means along its length selectively to connect with any of said circuitry paths crossing said length and means selectively to connect with a printed circuitry path on said base panel, and each connector having a mating part recessed in the side of a module unit with means for connection to a component lead thereof.

12. For use in a wiring framework in a modular circuit system, an insulating box having an open end for receiving the electrical components of a modular unit, a plurality of regularly spaced rectangular grooves in two opposite exterior sides of said box for containing the electrical contacts connecting the modular unit within the system, and a series of vee grooves in the land areas adjacent and parallel to said rectangular grooves, said vee grooves being of lesser depth than said rectangular grooves.

13. For use in a wiring framework in a modular circuit system, an insulating box having an open end for receiving the electrical components of a modular unit, a plurality of regularly spaced transverse channels in two opposite exterior sides of the box for containing the electrical contacts connecting the modular unit within the system, and a pair of contact keying slots in the bottom of said box each extending along a line intersecting the ends of the channels in one of said sides.

14. A sheet metal contact assembly for connecting a module to a printed circuit panel, said assembly comprising an elongated metallic blade having contact teeth laterally projecting from one side edge thereof, said teeth being for insertion in apertures in a printed circuit panel and for soldering to the printed circuitry of said panel, and an elongated channel-shaped socket for endwise receiving a second side edge of said blade opposite to said one side edge thereof, means for mounting said socket in a channel of the module, at least a pair of opposed sidewall portions of said socket being reentrantly curved, the base of said socket being slotted at least coextensively with the sidewall portions for releasing the portions for spring action, said portions being connected by said base at opposite ends of said slot, each pair of opposed sidewall portions having a relaxed spacing less than the blade thickness.

15. In a sheet metal contact assembly, an elongated channel-shaped socket for endwise receiving a blade from either end of said socket, at least a pair of opposed sidewall portions of said channel being reentrantly curved, the base of said channel being slotted intermediate its length at least coextensively with the sidewall portions for releasing the portions for spring action, said base being connected to said sidewall portions at each of opposite ends of said slot, each pair of opposed sidewall portions having a relaxed spacing less than the blade thickness.

16. A socket as set forth in claim 15 further including means for mounting said socket in a channel of a block structure and for connection to electrical components in the block structure.

17. An electrical socket contact in the form of a channel of resilient metal to be received in a vertical throughway in a supporting receptacle, the base of the channel being omitted from the side walls along an intermediate portion of the length of the member adjacent the upper end of the channel, thus leaving a pair of spaced webs along the base of the channel between said side walls, the side walls of the channel being bowed inwardly along said portion to provide, within the channel shape, resilient contact surfaces for engagement with a pin or the like inserted lengthwise into the mouth of the channel formed at its upper end, and means for securing the channel in the throughway against downward and upward movement.

* * * * *